US009304003B1

(12) United States Patent
Ashman et al.

(10) Patent No.: US 9,304,003 B1
(45) Date of Patent: Apr. 5, 2016

(54) AUGMENTED REALITY NAVIGATION

(71) Applicant: MICROSOFT TECHNOLOGY LICENSING, LLC, Redmond, WA (US)

(72) Inventors: Matthew Sammis Ashman, Bellevue, WA (US); Ethan Eade, Seattle, WA (US); Arthur Tomlin, Kirkland, WA (US); Tony Ambrus, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/661,940

(22) Filed: Mar. 18, 2015

(51) Int. Cl.
*G01C 21/20* (2006.01)
(52) U.S. Cl.
CPC .................................. *G01C 21/206* (2013.01)
(58) Field of Classification Search
CPC ...................................................... G01C 21/206
See application file for complete search history.

(56) References Cited

U.S. PATENT DOCUMENTS

| 5,249,128 | A | * | 9/1993 | Markandey | ........ | B60K 31/0008 |
| | | | | | | 180/170 |
| 7,272,474 | B1 | * | 9/2007 | Stentz | ...................... | G01C 7/04 |
| | | | | | | 701/26 |
| 8,195,386 | B2 | | 6/2012 | Hu et al. | | |
| 8,798,840 | B2 | | 8/2014 | Fong et al. | | |
| 8,825,398 | B2 | | 9/2014 | Alexandre et al. | | |
| 8,855,819 | B2 | | 10/2014 | Choi et al. | | |
| 2008/0054841 | A1 | * | 3/2008 | Kerkman | ................... | H02P 6/14 |
| | | | | | | 318/807 |
| 2012/0146998 | A1 | | 6/2012 | Kim et al. | | |
| 2013/0121985 | A1 | * | 5/2013 | Bartoov | ................... | A61K 31/00 |
| | | | | | | 424/94.6 |
| 2013/0332064 | A1 | | 12/2013 | Funk et al. | | |
| 2014/0139375 | A1 | | 5/2014 | Faragher et al. | | |

FOREIGN PATENT DOCUMENTS

CN 103282793 A 9/2013

OTHER PUBLICATIONS

Jang, et al., "Exploring Mobile Augmented Reality Navigation System for Pedestrians", In Proceedings of the UK 20th Annual Conference on GIS Research, Apr. 11, 2012, 6 pages.

(Continued)

*Primary Examiner* — James Trammell
*Assistant Examiner* — James E Stroud
(74) *Attorney, Agent, or Firm* — Dan Choi; Judy Yee; Micky Minhas

(57) ABSTRACT

A computing device includes a location sensor system including sensor(s) configured to measure one or more parameters of a surrounding environment, a pose-tracking engine configured to determine a current pose of the computing device based on the one or more measured parameters of the surrounding environment, a graphing engine configured to access a traversability graph including a plurality of vertices each having a local coordinate system, a navigation engine configured to identify a nearby vertex of the traversability graph to the current pose, and configured to determine a path of traversable edges between the nearby vertex and a destination vertex of the traversability graph, and a display configured to visually present as an overlay to the environment a navigation visualization corresponding to the path.

20 Claims, 8 Drawing Sheets

(56) References Cited

OTHER PUBLICATIONS

Ventura, et al., "Global Localization from Monocular SLAM on a Mobile Phone", In Proceedings of IEEE Transactions on Visualization and Computer Graphics vol. 20, Issue 4, Apr. 2014, 9 pages.

Carrera, et al., "Lightweight SLAM and Navigation with a Multi-Camera Rig", In Proceedings of the 5th European Conference on Mobile Robots, Sep. 7, 2011, 6 pages.

Surabhi, Sudeshna., "SLAM: Simultaneous Localization and Mapping of Small Sized Ground Robotic Vehicles", : In Journal of Electrical and Electronics Engineering, vol. 9, Issue 3, May 2014, 7 pages.

Klein, et al., "Parallel Tracking and Mapping for Small AR Workspaces", In Proceedings of the 6th IEEE and ACM International Symposium on Mixed and Augmented Reality, Nov. 13, 2007, pp. 84-90.

\* cited by examiner

_US 9,304,003 B1_

AUGMENTED REALITY NAVIGATION

BACKGROUND

Computer-assisted navigation may be provided to a user in real time. For example, a global positioning system (GPS) device may provide turn-by-turn directions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device includes a location sensor system including one or more sensors configured to measure one or more parameters of a surrounding environment, a pose-tracking engine configured to determine a current pose of the computing device based on the one or more measured parameters of the surrounding environment, a graphing engine configured to access a traversability graph including a plurality of vertices each having a local coordinate system and pose relative to the local coordinate system, a navigation engine configured to identify a nearby vertex of the traversability graph to the current pose, and configured to determine a path of traversable edges between the nearby vertex and a destination vertex of the traversability graph, and a display configured to visually present as an overlay to the environment a navigation visualization corresponding to the path.

DETAILED DESCRIPTION

Current navigation approaches employ a global positioning system (GPS) and/or other location tracking systems to track a position of a computing device associated with a user. However, such position tracking systems provide inadequate position tracking accuracy for navigation on a pedestrian-scale. In particular, such position tracking systems significantly suffer from accuracy issues when trying to track a position of a computing device associated with a user that is located indoors.

The present disclosure relates to an approach for providing a pedestrian-scale navigation directions to a user. More particularly, the present disclosure relates to using a pose-anchored traversability graph of an environment to provide pedestrian-scale navigation directions to a user. The traversability graph may be created using pose tracking data derived from one more measured parameters of the surrounding environment (e.g., generated from recorded walking patterns of one or more users as they walk throughout the environment). The traversability graph may include a plurality of vertices. In particular, each vertex may be associated with a different pose (e.g., in six degrees of freedom (6DOF) that is relative to a different local coordinate system. Further, vertices of the traversability graph may be connected by traversable edges that represent either known or inferred paths that are traversable by a user. For example, the pedestrian-scale navigation directions may correspond to a path of traversable edges along the traversability graph between a vertex proximate (e.g., nearest) to a current pose of a computing device associated with a user and a destination vertex of the traversability graph.

Since the traversability graph is anchored to different local coordinate systems in multiple different places, pose tracking and navigation may be provided with an increased level of accuracy relative to GPS and other location tracking systems. Moreover, such an approach may provide accurate pose tracking and navigation in environments where GPS and other location tracking systems are inaccurate or unavailable, such as indoors. Furthermore, the level of pose tracking and navigation accuracy provided by such an approach may allow for pedestrian-scale navigation directions to be visually presented in real-time as an augmented reality (AR) overlay to the surrounding environment.

Figure 1:
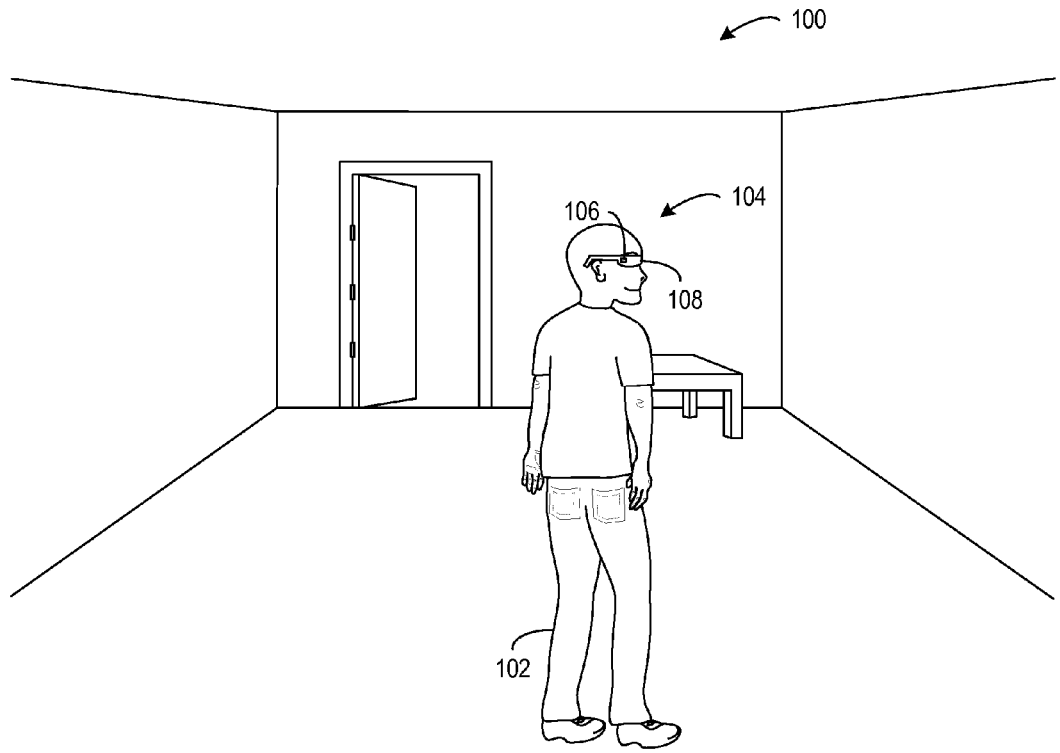
FIG. 1 shows an example environment in which a user may interact with a computing device that provides pedestrian-scale navigation.

FIG. 1 shows an example environment 100 in which a user 102 may interact with a computing device 104. In this example, the environment 100 is a room inside of a building. The environment 100 may extend to different portions of the building, such as different rooms or different floors in the building. The environment 100 may encompass any suitable size of area. For example, the environment 100 may extend to outside of the building, such as down the street to a different building. Moreover, the user 102 may interact with the computing device 104 to receive pedestrian-scale navigation directions in any suitable environment having any suitable size.

The computing device 104 is depicted as a head-mounted computing device including a location sensor system 106 and a see-through display 108. The location sensor system 106 may include one or more sensors configured to measure one or more parameters of the surrounding environment 100. The one or more parameters measured by the location sensor system 106 may be used to determine a current pose (e.g., in 6DOF) of the computing device 104 in the environment 100. The current pose of the computing device 104 may be used to determine pedestrian-scale navigation directions that may guide the user 102 to walk to a desired destination in the environment 100. For example, in the illustrated example, a desired destination may be a different room inside the building, a location down the street, or another location within walking distance.

In one example, the pedestrian-scale navigation directions may follow a traversability graph of the environment 100. For example, the traversability graph may be generated from recorded walking patterns of the user 102 (and/or other users) as he (and/or they) walk throughout the environment 100. In particular, the pedestrian-scale navigation directions may correspond to a shortest path of traversable edges between a vertex of the traversability graph proximate (e.g., nearest) to the current pose of the computing device 104 and a destination vertex of the traversability graph.

The see-through display 108 may be configured to visually present a navigation visualization representative of the pedestrian-scale navigation directions as an overlay to a portion of the environment 100 viewable through the see-through display 108. The navigation visualization may be visually presented by the display in real-time as the user 102 moves through the environment 100. Moreover, responsive to the user 102 moving to a different pose in the environment 100, the shortest path along the traversability graph may be updated based on the different pose, and visual presentation of the navigation visualization may be dynamically updated to reflect the updated shortest path.

Figure 2:
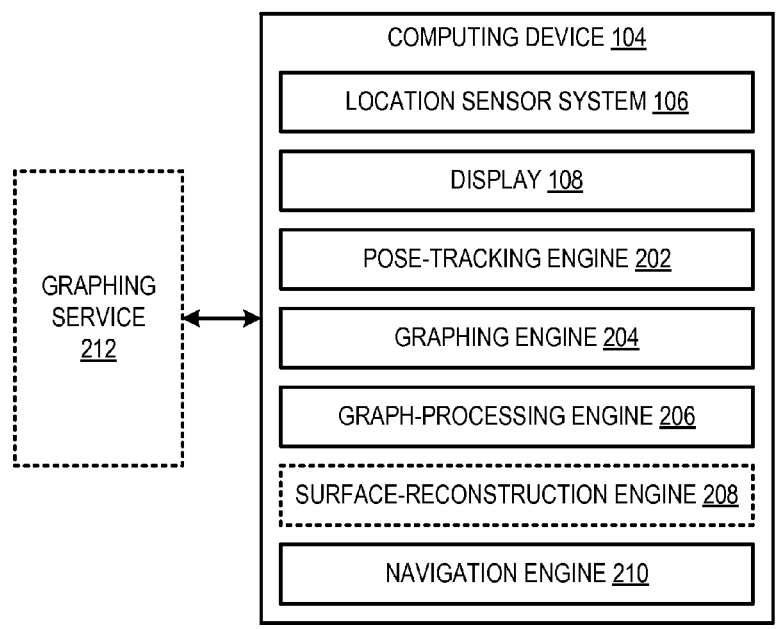
FIG. 2 shows an example system architecture of the computing device shown in FIG. 1.

FIG. 2 shows an example system architecture of the computing device 104 shown in FIG. 1. The computing device 104 may include various engines configured to perform different operations related to providing pedestrian scale navigation. In particular, the computing device 104 may include a pose-tracking engine 202, a graphing engine 204, a graph-processing engine 206, a surface-reconstruction engine 208, and a navigation engine 210.

The pose-tracking engine 202 may be configured to determine a current pose of the computing device 104 based on one or more parameters of the surrounding environment measured by one or more sensors of the location sensor system 106. In one example, a current pose may be a 3-DOF pose including translational components (e.g., X, Y, Z). In other words, the pose may be a point in 3D space. In another example, the current pose may be a 6-DOF pose including translation components (e.g., X, Y, Z) and rotation components ((e.g., pitch, roll, yaw), or more generally a 3×3 rotation matrix).

In one example, the current pose of the computing device 104 may be determined using a vision-based simultaneous localization and mapping (SLAM) pose tracking approach. Vision-based SLAM may use visual feature tracking of image keyframes in combination with position data (e.g., provided by an inertial measurement unit (IMU)) to track a pose of the computing device relative to a local coordinate system (or local coordinate frame). In some implementations, SLAM pose tracking may be performed using images provided by stereo cameras that may be included in the location sensor system 106. In some implementations, vision-based SLAM may be performed using depth images provided by one or more depth cameras that may be included in the location sensor system 106.

Furthermore, in implementations that employ SLAM pose tracking, the pose-tracking engine 202 may be configured to create a pose graph that connects different local coordinate systems together via transformations that represent edges of the pose graph. In one example, the edges may be expressed as SE(3) transformations that may equate to 6-DOF poses. The SE(3) transformations may be used along with additional measurements/visual information (e.g., visual landmarks) to make bundle adjustments of the local coordinate frames. The pose graph may be queried to estimate a relative pose of the computing device 104 between local coordinate frames. Moreover, an instantaneous pose of the computing device 104 may be generally tracked relative to an "active" (e.g., nearest) local coordinate frame.

By employing the SLAM pose tracking approach, pose estimation may be robustly performed with minimal drift error. In particular, the error in pose estimation relative to any given local coordinate frame may be related to a distance from the local coordinate frame to the estimated pose. Because the pose graph connects multiple local coordinate frames, a distance from a pose estimation to any given local coordinate frame may be small enough to provide a level of pose estimation accuracy suitable for providing pedestrian-scale navigation directions.

SLAM is merely one example approach for determining a pose of the computing device 104, and the pose-tracking engine 202 may be configured to perform any suitable approach to determine a pose of the computing device 104. For example, the pose-tracking engine 202 may be configured to determine a pose of the computing device 104 with suitable speed and precision to produce pedestrian-scale navigation directions in real-time as an AR overlay to the surrounding environment.

The graphing engine 204 may be configured to create a traversability graph of the environment 100. The traversability graph may include a plurality of vertices. Each of the plurality of vertices may be associated with a different local coordinate frame (or local coordinate system) of the pose graph. Each of the plurality of vertices may be connected to at least one other vertex of the traversability graph by a traversable edge.

Figure 3:
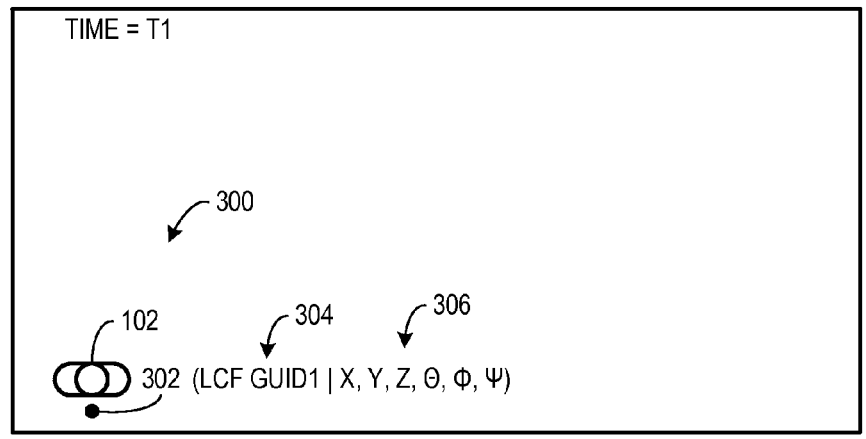
FIGS. 3-5 show an example scenario of creating a traversable path of vertices that may be integrated into a traversability graph.
Figure 4:
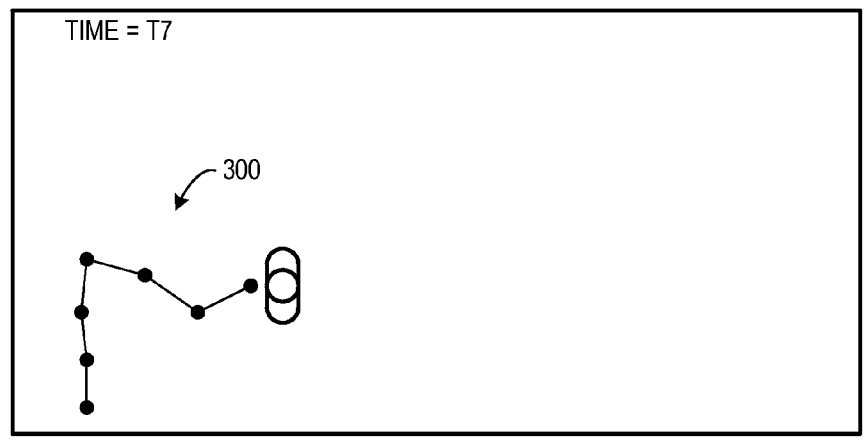
Figure 5:
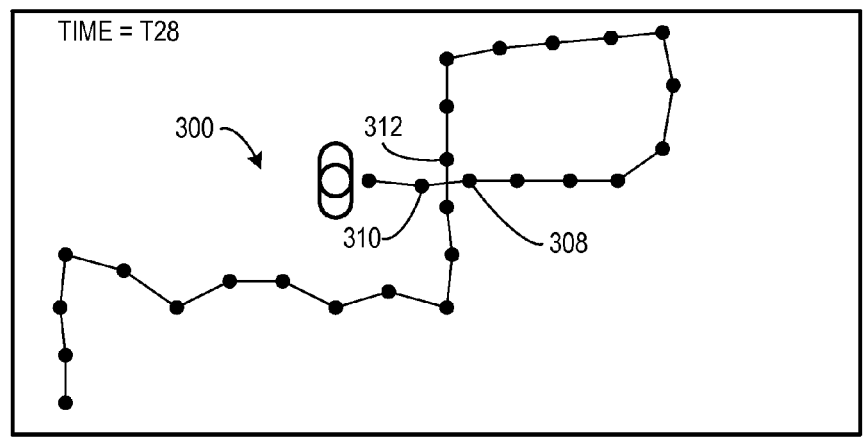

FIGS. 3-5 show an example scenario where the graphing engine 204 creates a traversable path of vertices that may be integrated into a traversability graph 300. In FIG. 3, at time T1, the user 102 begins a new walking path with the pose-tracking engine 202 actively tracking the pose of the computing device 104. In particular, the graphing engine 204 creates a first vertex 302 of the traversability graph 300. The first vertex 302 may include an identifier 304 and a pose 306. The identifier 304 may correspond to a nearby local coordinate frame of the pose graph provided by the pose-tracking engine 202. For example, the nearby local coordinate frame may be a nearest local coordinate frame. In some implementations, the identifier 304 may be a globally unique identifier (GUID). The pose 306 may be a current pose provided by the pose-tracking engine 202. The pose 306 may be expressed relative to the local coordinate frame corresponding to the identifier 304. Although the pose 306 is shown as a 6-DOF pose, in some implementations, the pose 306 may be a 3-DOF pose (e.g., x, y, z), a 2-DOF pose (e.g., x, y), or another suitable pose.

Furthermore, the graphing engine 204 may be configured to, e.g., in response to the computing device 104 traveling a designated distance from a most recently created vertex, create a new vertex on the traversability graph 300. In other words, a designated distance may be maintained between each created vertex and that vertex's predecessor. In one particular example, the designated distance may be set to one meter. Any suitable pedestrian-scale distance may be selected to space apart the vertices by a fixed distance. In other implementations, triggers other than distance (e.g., elapsed time) may be used to create a new vertex. Further, the graphing engine 204 may be configured to, responsive to creating a new vertex, create a known traversable edge to connect the new vertex to the next most recently created vertex.

Note that a known traversable edge represents a path that the computing device 104 (or another computing device) has actually traversed during creation of a traversability graph.

In FIG. 4, at time T7, the user 102 has walked a distance far enough to cause the graphing engine 204 to create seven vertices on the traversability graph 300. Each vertex of the traversability graph 300 includes a different pose that is relative to a local coordinate system. In some cases, each vertex may be relative to a different local coordinate system. In other cases, multiple vertices may share the same local coordinate system. For example, portions of the traversability graph that are spatially dense may include multiple vertices that share a common local coordinate system. On the other hand, portions of the traversability graph that are spatially sparse may include multiple vertices each being relative to a different local coordinate system.

In FIG. 5, at time T28, the user 102 has walked a distance far enough to cause the graphing engine 204 to create twenty-eight vertices on the traversability graph. Note that although the path walked by the user 102 crosses over itself, the graphing engine 204 only creates known traversable edges between vertices that the user 102 has actually walked. For example, the graphing engine 204 creates a known traversable edge between vertex 308 and vertex 310. However, the graphing engine 204 does not create a traversable edge between vertex 308 and vertex 312, because the user 102 did not walk between vertex 308 and vertex 312.

The graphing engine 204 may be configured to create vertices and edges of a traversability graph as long as the pose-tracking engine 202 is providing pose tracking data to the graphing engine 204. If the pose-tracking engine 202 is unable to provide pose tracking data to the graphing engine 204 (e.g., due to lack of feature recognition), then the graphing engine 204 ends the traversable path. Subsequently, the graphing engine 204 starts a new traversable path once the pose tracking data becomes available from the pose-tracking engine 202.

Figure 6:
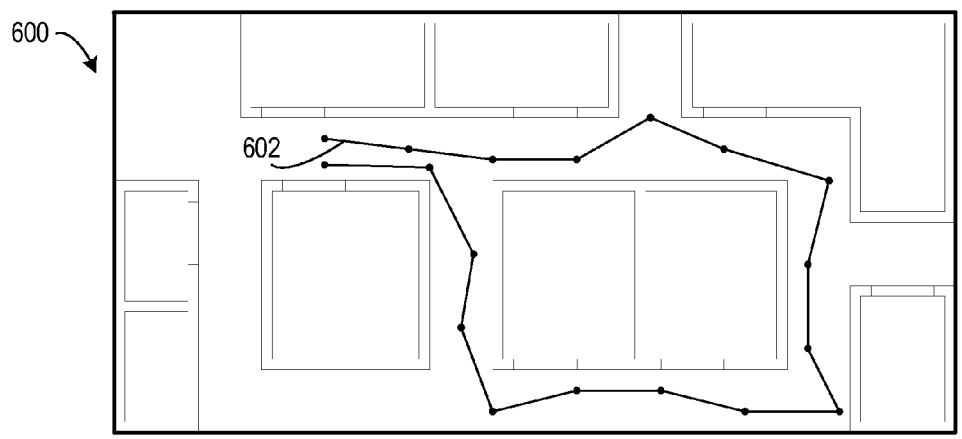
FIGS. 6-8 show different example traversal paths in an environment.
Figure 7:
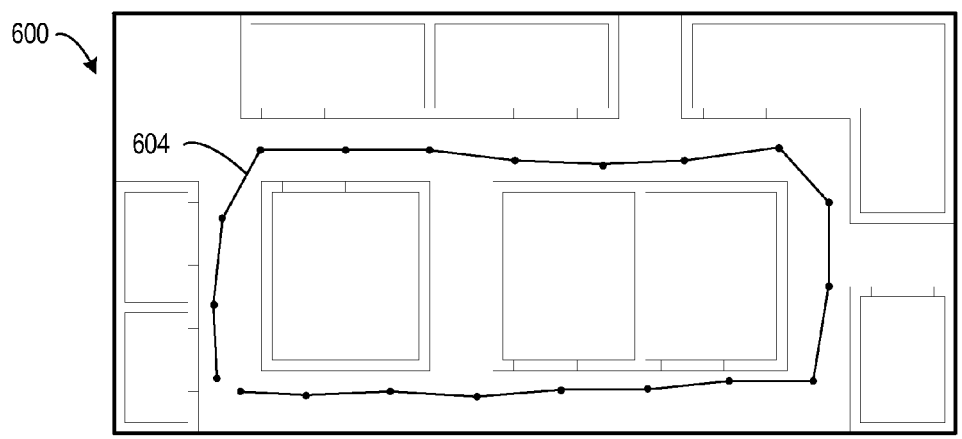
Figure 8:
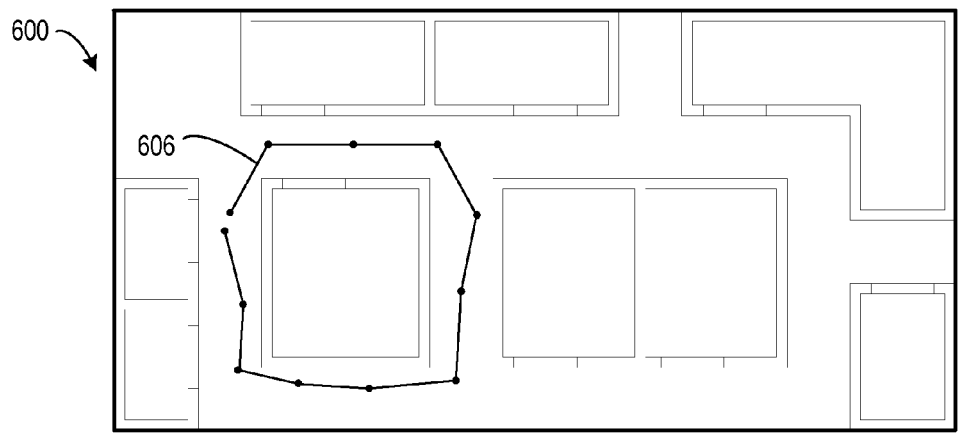

Any suitable number of traversable paths may be integrated into a traversability graph of an environment. FIGS. 6-8 show a floorplan of an example environment 600. For example, the environment may be an office building including a plurality of offices separated by various hallways. FIG. 6 shows a first traversal path 602 in the environment 600. The first traversal path 602 begins in an upper left-hand corner of the floorplan, and loops around two central offices and returns through a central hallway back to the approximate starting point. The first traversal path 602 includes seventeen vertices.

FIG. 7 shows a second traversal path 604 in the environment 600. The second traversal path 604 begins in a lower left-hand corner of the floorplan, and loops through the outer hallways of the office building around three central offices and returns back to the approximate starting point. The second traversal path 604 includes nineteen vertices.

FIG. 8 shows a third traversal path 606 in the environment 600. The third traversal path 606 begins in the upper left-hand corner of the floorplan, and travels through the center hallway to complete a loop around one central office to return back to the approximate starting point. The third traversal path includes twelve vertices.

Each of the example traversal paths were created in the same environment, yet each traversal path provides different data points that may be integrated into a traversability graph of the environment 600 to provide accurate pose tracking and spatial mapping of users relative to the environment 600.

In one example, the first traversal path 602, the second traversal path 604, and the third traversal path 606 may be generated by the same computing device as the computing device moves throughout the environment 600 at different times. In other words, the three different traversal paths are not temporally overlapping. For example, the user 102 may create the three different traversal paths over the course of a day while moving throughout the office building. In this example, the graphing engine 204 may be configured to create the traversability graph of the environment 600 from pose tracking data (e.g., different traversal paths) provided from tracking a pose of just the computing device 104 as the computing device 104 moves throughout the environment.

In some implementations, a traversability graph optionally may be created from pose tracking data corresponding to a pose of each of a plurality of different computing devices as each of the plurality of computing devices move throughout an environment. For example, the first traversal path 602 may be created by a first computing device as the first computing device moves throughout the environment 600. Further, the second traversal path 604 may be created by a second computing device as the second computing device moves throughout the environment 600. Further still, the third traversal path 606 may be created by a third computing device as the third computing device moves throughout the environment 600. In one example, the three different computing devices may move throughout the environment 600 to create the three different traversal paths at the same time. In another example, the three different computing devices may move throughout the environment 600 to create the three different traversal path at different times.

In such implementations where a traversability graph is created by collecting pose tracking data and/or traversal paths from different computing devices, a network-accessible service computing device may be implemented to collect and integrate the traversal paths into a traversability graph.

Returning to FIG. 2, in one example, the computing device 104 may be configured to send pose estimation data (e.g., a pose estimated relative to a local coordinate frame) determined by the pose-tracking engine 202 and traversal paths of the environment 100 (and/or other pose tracking data) determined by the graphing engine 204 to a graphing service computing device 212 for integration into a traversability graph of the environment 100. In particular, the graphing service computing device 212 may be configured to receive estimated relative poses, local coordinate frames, and traversal paths of the environment 100 from various graphing engines of different computing devices that move throughout the environment 100. The graphing service computing device 212 may be configured to integrate each received traversal path into a traversability graph of the environment 100. Correspondingly, in such implementations, the graphing service computing device 212 may be configured to share portions of the traversability graph and corresponding local coordinate frames tied to visual tracking data with requesting client computing devices. Such information may allow the requesting client computing devices to accurately estimate device pose relative to a nearby local coordinate frame. In one example, the graphing engine 204 may be configured to access the traversability graph of the environment 100, associated local coordinate frames, and/or visual tracking data to accurately estimate a pose of the computing device 104 in order to provide pedestrian-scale AR navigation directions.

In another implementation, a pose-tracking service computing device that is separate from the graphing service computing device may be configured to manage pose tracking data collected from different client computing devices. In such an implementation, a client computing device may request access to pose tracking data, local coordinate frames, and/or visual tracking data from the pose-tracking service computing device. Further, the client computing device may separately request access to the traversability graph from the graphing service computing device.

Figure 9:
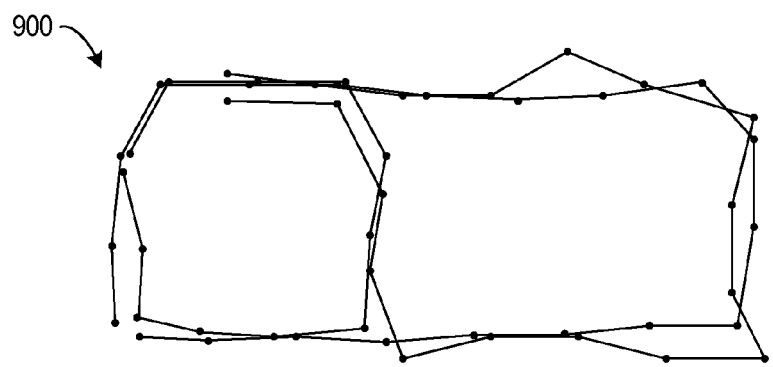
FIG. 9 shows an example traversability graph created from the traversal paths shown in FIG. 6-8.

FIG. 9 shows an example traversability graph 900 created by combining the traversal paths shown in FIG. 6-8. In particular, the three different traversal paths may be spatially registered with each other to create the traversability graph 900.

Returning to FIG. 2, in some implementations, a traversability graph may be created locally on the computing device 104 by the graphing engine 204. In some implementations, a traversability graph may be created remotely by the graphing service computing device 212. In yet another implementation, the graph-processing engine 206 may be configured to integrate sections of vertices and known traversable edges (also referred to as traversal paths) that were created by the graphing engine 204 into the traversability graph of the environment 100.

Furthermore, the graph-processing engine 206 may be configured to perform various inference, validation, and collapse/removal operations to maintain reasonable growth of vertices and traversable edges when merging new traversal paths into a traversability graph. In one example, the graph-processing engine 206 may be configured to identify previously unconnected pairs of vertices of the traversability graph that are spaced apart a distance less than a distance threshold. Any suitable distance threshold may be employed. In one example, the distance threshold may be fifty centimeters. Further, the graph-processing engine 206 may be configured to, for each identified previously unconnected pair of vertices, create an inferred traversable edge between the pair of vertices. An inferred traversable edge indicates a potential traversable path that may be considered when determining a traversable path along the traversability graph to provide navigation directions to a user.

Figure 10:
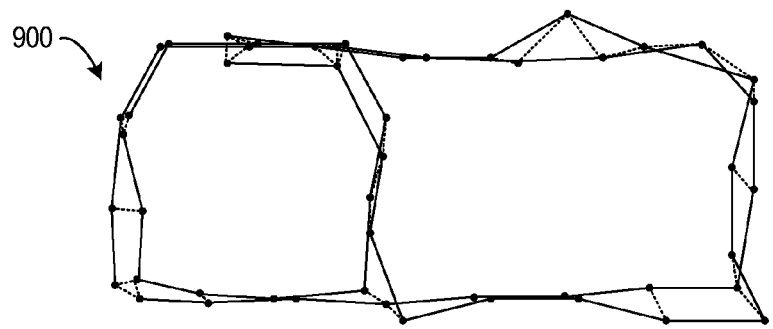
FIG. 10 shows the traversability graph of FIG. 9 with added inferred traversable edges.

FIG. 10 shows the traversability graph 900 with added inferred traversable edges. In particular, known traversable edges are indicated by solid lines and inferred traversable edges are indicated by dotted lines. By adding the inferred traversable edges to the traversability graph, complete subgraphs where traversable paths intersect may be created. The additional intersections may allow for shorter navigation paths to be identified when providing pedestrian-scale navigation directions along the traversability graph.

Returning to FIG. 2, the graph-processing engine 206 may be further configured to perform collapse operations on the traversability graph to reduce a size and order of the traversability graph. In one example, the graph-processing engine 206 may be configured to collapse any inferred traversable edge having a length that is less than a length threshold from the traversability graph. For example, the length threshold may be less than the distance threshold. Note that the collapse operation may include removing and/or merging one or more vertices of the traversability graph. Further, the graph-processing engine 206 may be configured to, for each pair of vertices connected to a collapsed inferred traversable edge, remove one vertex of the pair of vertices from the traversability graph. Further, the graph-processing engine 206 may be configured to create a new inferred edge between a remaining vertex of the pair of vertices and a vertex nearest to the remaining vertex of the traversability graph. In this way, multi-segment paths may be simplified into fewer (e.g., longer) segments so that the traversability graph will not include redundant multi-segment paths traversing a span also traversed by fewer (e.g., a single) segments.

Figure 11:
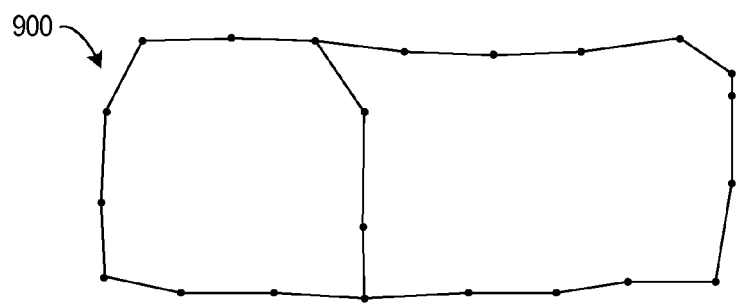
FIG. 11 shows the traversability graph of FIG. 10 with redundant edges and vertices removed.

FIG. 11 shows the traversability graph 900 after undergoing collapse operations by the graph-processing engine 206. In particular, short inferred traversable edges, redundant edges, and redundant or isolated vertices are collapsed in the traversability graph. Such operations may be performed to ensure that the traversability graph remains computationally lightweight to allow for providing pedestrian-scale navigation in real-time.

Returning to FIG. 2, in some implementations, the computing device 104 optionally may include the surface-reconstruction engine 208. The surface-reconstruction engine 208 may be configured to identify surfaces in the environment 100 using one or more measured parameters provided by one or more sensors of the location sensor system 106. In one example, the location sensor system 106 may include stereo cameras, and the surface-reconstruction engine 208 may be configured to analyze images provided by the stereo cameras to identify surfaces in the environment. In another example, the location sensor system 106 may include a time-of-flight (TOF) depth camera, and the surface-reconstruction engine 208 may be configured to analyze depth images provided by the TOF depth camera to identify surfaces in the environment. Further, in either example, the images may be spatially registered to keyframes created by the pose-tracking engine 202. The graph-processing engine 206 may leverage such spatial registration to identify inferred traversable edges of the traversability graph that pass through surfaces identified by the surface-reconstruction engine 208. In one example, the graph-processing engine 206 may be configured to remove/collapse any identified inferred traversable edges that pass through a surface that has been identified by the surface-reconstruction engine 208 from the traversability graph. Further, in some implementations, the graph-processing engine 206 may be configured to validate any inferred traversable edges as not passing through a surface that has been identified by the surface-reconstruction engine. Such surface analysis may optionally be performed by graphing service computing device 212.

Figure 12:
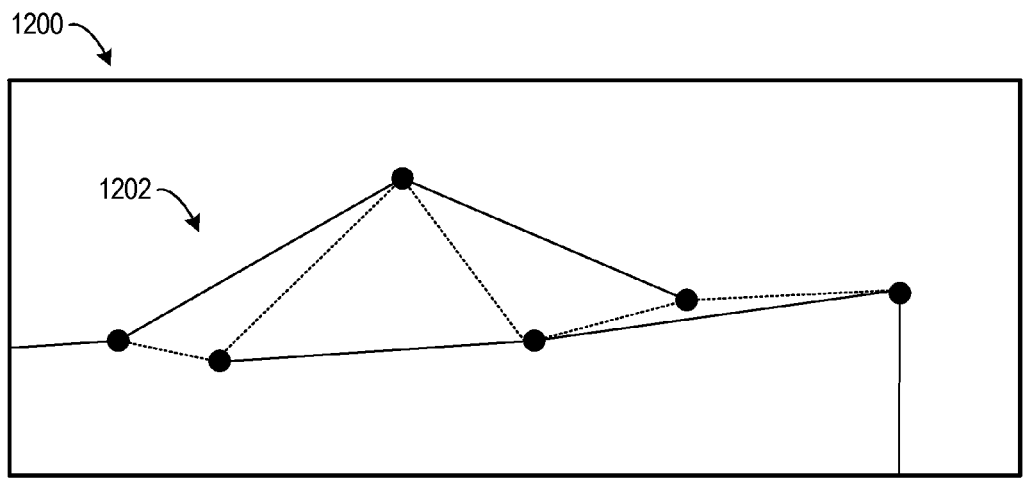
FIGS. 12-14 show an example scenario where surface reconstruction data is used to remove an inferred traversable edge that travels through a surface of an environment from a traversability graph.
Figure 13:
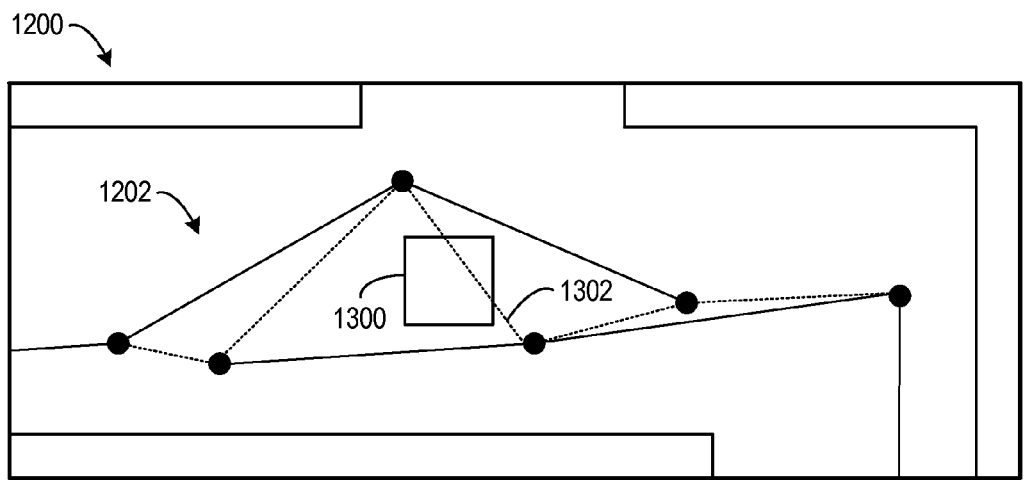
Figure 14:
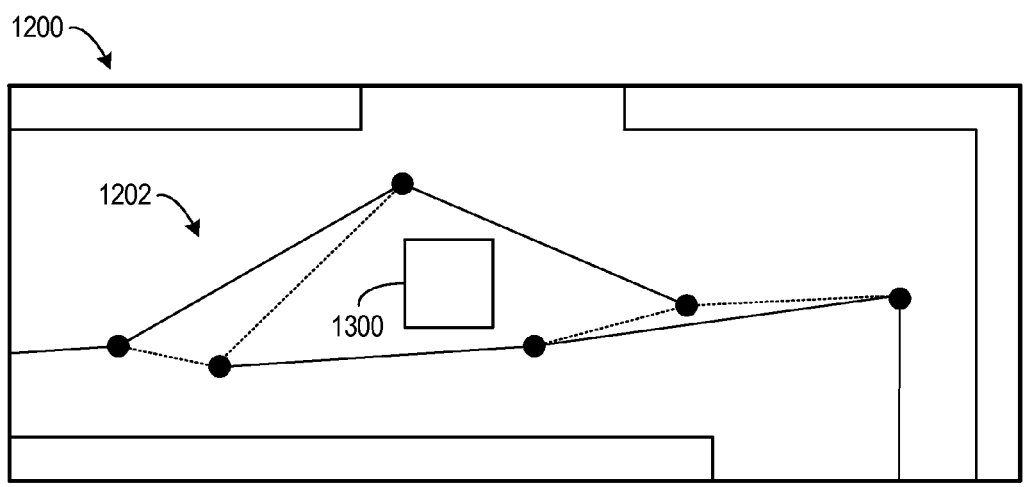

FIGS. 12-14 show an example scenario where surface reconstruction data is used to remove an inferred traversable edge that travels through a surface of an environment from a traversability graph. FIG. 12 shows an environment 1200 including a portion 1202 of a traversability graph. The portion 1202 includes known traversable edges (indicated by solid lines) and inferred traversable edges (indicated by dotted liens).

FIG. 13 shows the environment 1200 including surfaces identified by the surface-reconstruction engine 208. In this example, the surface-reconstruction engine 208 identifies a pillar 1300 positioned in the middle of a hallway where the portion 1202 of the traversability graph is located. The graph-processing engine 206 identifies that an inferred traversable edge 1302 passes through at least one surface of the pillar 1300. Accordingly, as shown in FIG. 14, the graph-processing engine 206 removes the inferred traversable edge from the portion 1202 of the traversability graph. The inferred traversable edge may be removed from the traversability graph in order to prevent navigation directions that direct a user into the pillar 1300.

Returning to FIG. 2, in some implementations, operations performed locally by the computing device 104 may instead be performed by the graphing service computing device 212. For example, the graphing service computing device 212 may be configured to perform pose-tracking operations based on sensor data (e.g., image data) received from the computing device 104, and configured to send a determined pose of the computing device 104 to the computing device. As another example, the graphing service computing device 212 may be configured to perform traversability graph creation operations based on traversal paths (and/or other pose tracking data) of the computing device 104 (and/or other computing devices). As another example, the graphing service computing device 212 may be configured to perform inference and collapse/removal operations on the traversability graph in the same manner as discussed above. As another example, the graphing service computing device 212 may be configured to perform navigation operations for the computing device 104.

Furthermore, in implementations where surface reconstruction operations are performed by the computing device 104, the computing device 104 may be configured to send surface reconstruction data to the graphing service computing device 212. The graphing service computing device 212 may be configured to validate inferred traversable edges of the traversability graph using the surface reconstruction data. In other implementations, the graphing service computing device 212 may be configured to perform surface reconstruction operations to identify surfaces in an environment based on sensor data (e.g., image data) received from the computing device 104. Further, the graphing service computing device 212 may be configured to validate edges in a traversability graph as not passing through identified surfaces of the environment.

Any combination of the above-described operations may be performed by the graphing service computing device 212 on behalf of the computing device 104. In some implementations, the graphing service computing device 212 may perform such operations when the computing device 104 is able to communicate with the graphing service computing device 212 (e.g., when the computing device 104 is "online"). Further, the computing device 104 may perform such operations when the computing device 104 is not able to communicate with the graphing service computing device 212 (e.g., when the computing device 104 is "offline"). In other implementations, operations performed locally by each of the modules of the client computing device instead may be performed remotely by a separate service computing device.

Continuing with FIG. 2, the navigation engine 210 may be configured determine pedestrian scale navigation directions to the user 102 that may allow the user 102 to be directed to a desired destination in the environment 100. In particular, the navigation engine 210 may be configured to identify a nearby vertex of the traversability graph relative to the current pose of the computing device 104 provided by the pose-tracking engine 202. In one example, the nearby vertex is a vertex nearest to the current pose. In another example, a nearby vertex that is not the nearest vertex may be selected. For example, a second nearest, third nearest, fourth nearest, or other vertex may be selected.

The navigation engine 210 may be configured to determine a path of traversable edges between the nearby vertex and a destination vertex of the traversability graph. For example, the destination vertex may be a vertex of the traversability graph nearest to a location provided by the user 102. In another example, vertices of the traversability graph may be annotated as corresponding to various destinations of interest, and the user 102 may select a given vertex as the destination vertex.

Typically, the determined path may be a shortest path of traversable edges between the nearby vertex and the destination vertex. Such a path may include known traversable edges and inferred traversable edges. In one example, the navigation engine 210 may determine the shortest path using a Dijkstra algorithm. In another example, the navigation engine 210 may determine the shortest path using an A* algorithm. The navigation engine 210 may employ any suitable algorithm to determine a shortest path along the traversability graph.

In some cases, the navigation engine 210 may determine a path other than a shortest path along the traversability graph to a destination vertex. In some implementations, the user 102 may select various navigation constraints that influence the path determination. For example, the user 102 may implement a navigation constraint indicating that the user 102 does not want to walk up stairs. Accordingly, the navigation engine 210 may determine a path that directs the user 102 to an elevator, even though a path up the stairs may be shorter. In other words, the navigation engine 210 may be configured to take into consideration navigation information (e.g., user constraints, semantic labels, and other metadata) beyond determining a path along the traversability graph in order to provide navigation directions to a user.

Furthermore, as the user 102 moves throughout the environment 100 causing the current pose of the computing device 104 to change, the navigation engine 210 may be configured to re-identify a nearby vertex responsive to the change in the current pose. Further, the navigation engine 210 may be configured to re-determine the shortest path responsive to a change in the nearby vertex. In other words, the navigation engine 210 automatically re-computes the shortest path whenever the closest vertex is not included in the previously computed path.

Continuing with FIG. 2, the display 108 may be configured to visually present as an overlay to the environment 100 a navigation visualization corresponding to the path determined by the navigation engine 210. The navigation visualization may include any suitable AR text, imagery, and/or video that visually presents navigation directions along the path of the traversability graph to the user 102. The overlay of the navigation visualization may be presented on any suitable viewable portion of the display 108. Moreover, the navigation visualization may augment the environment 100 in any suitable manner.

In some scenarios, the navigation visualization may be body-locked, such that the position of the navigation visualization on the display 108 remains fixed relative to the user 102 as the user 102 moves throughout the environment 100. In some scenarios, the navigation visualization may be world-locked, such that the position of the navigation visualization on the display 108 remains fixed relative to a 3D point in the environment and changes position relative to the user 102 as the user 102 moves throughout the environment 100.

Figure 15:
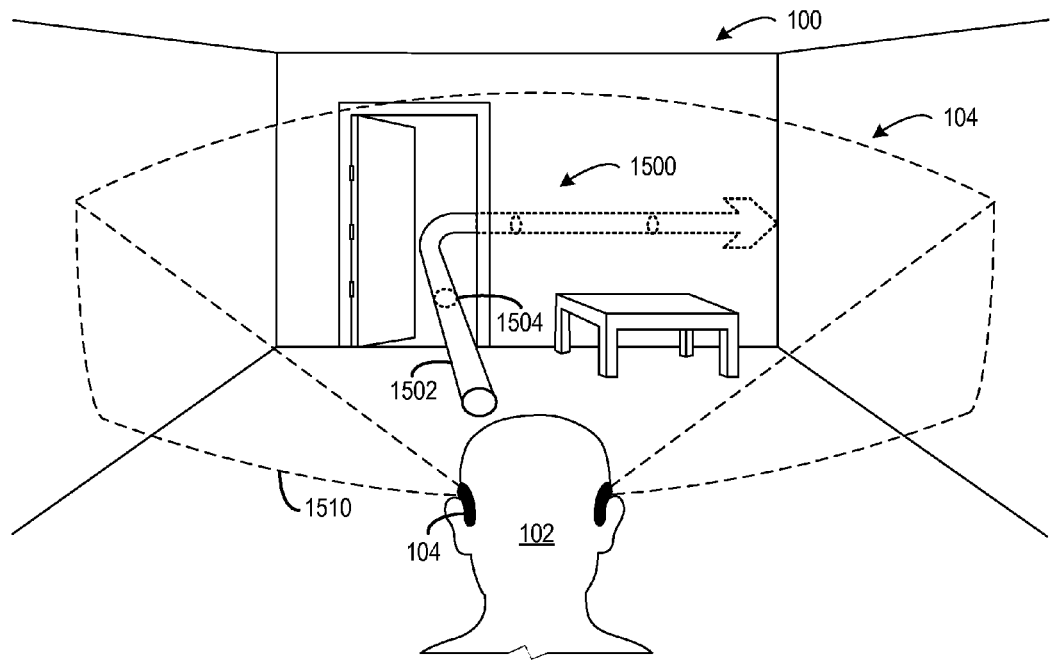
FIGS. 15-16 show an example navigation visualization that includes a visual representation of a path of traversable edges of a traversability graph.
Figure 16:
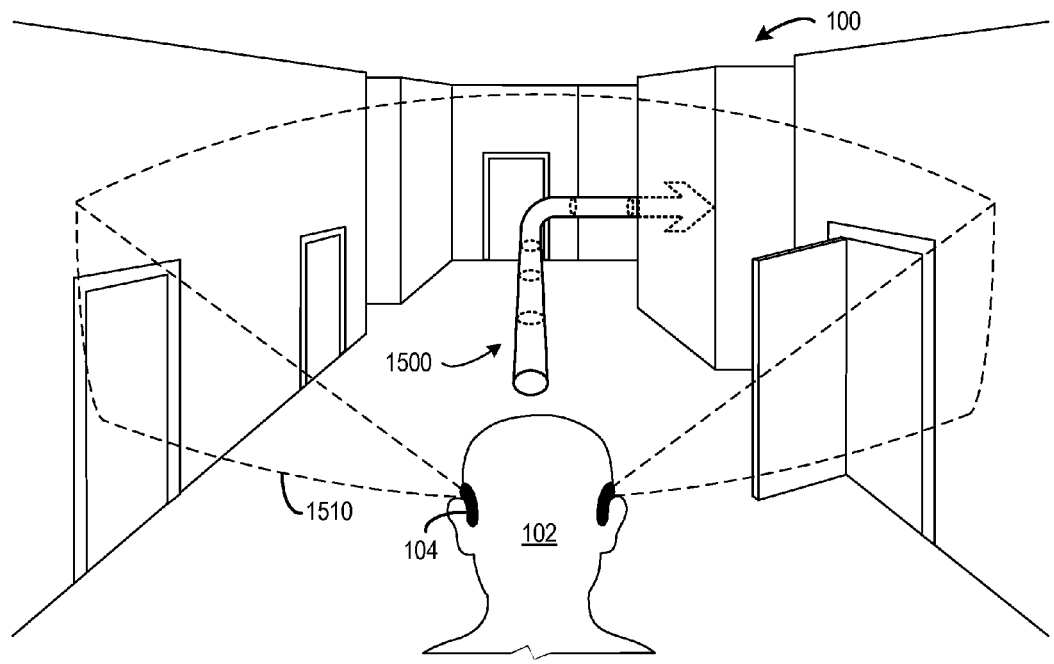

FIGS. 15-16 show an example navigation visualization 1500 that includes a visual representation of a path of traversable edges of a traversability graph. FIG. 15 shows the environment 100 as viewed by the user 102 through a field of view 1510 of the display 108 (shown in FIG. 1) of the head-mounted computing device 104. In the illustrated example, the navigation visualization 1500 includes a visual representation of a 3D tube that approximates the position of the path. The 3D tube 1500 may appear to be floating in the environment 100. The 3D tube 1500 may be visually apportioned into segments 1502 that represent traversable edges of the path. Each of the segments 1502 may be defined by visual representations of cross-sections 1504 of the 3D tube that represent vertices of the path.

In implementations of the head-mounted computing device 104 that include the surface-reconstruction engine 208, the display 108 may be configured to use surface reconstruction data provided by the surface-reconstruction engine 208 to present a portion of the 3D tube 1500 that is directly viewable by the user 102 from the current pose with a prominent appearance (e.g., solid lines, less transparency, or more vibrant color). Further, the display 108 may be configured to display, in the field of view 1510, a portion of the 3D tube 1500 that may be occluded by real-world surfaces in the environment 100 with a less prominent appearance (e.g., dotted lines, more transparency, less vibrant color) using the surface reconstruction data provided by the surface-reconstruction engine 208. Such a visual feature may provide a natural and immersive AR experience to the user 102.

In this example, the computing device 104 is positioned on the head of the user 102. As such, the pose coordinate frame of the computing device 104 and the head of the user 102 move together. In order for the user 102 to be able to actually view the 3D tube 1500 in the field of view 1510, the display 108 may be configured to offset a height of the 3D tube 1500 from the height of the computing device 104. In one example, the height of the 3D tube may be fifty centimeters shorter than the height of the computing device 104.

In FIG. 16, the user 102 has followed the 3D tube 1500 out of the room and into a hallway. As the user 102 moves throughout the environment 100, the display 108 updates presentation of the 3D tube 1500, in the field of view 1510 to correspond to a vertex of the path that is nearest to a current pose of the computing device 104.

The 3D tube 1500 is merely one example of a visual representation of the path along the traversability graph. Any suitable visual representation of the path may be visually presented by the display 108. For example, the path may be visually represented by a line displayed on surfaces of the environment 100, such as along the floor. In another example, the path may be visually represented by flashing waypoints, slaloms, or hoops corresponding to the vertices of the path. As another example, the path may be represented by a sprite or other animation that travels from vertex to vertex in front of the user.

Figure 17:
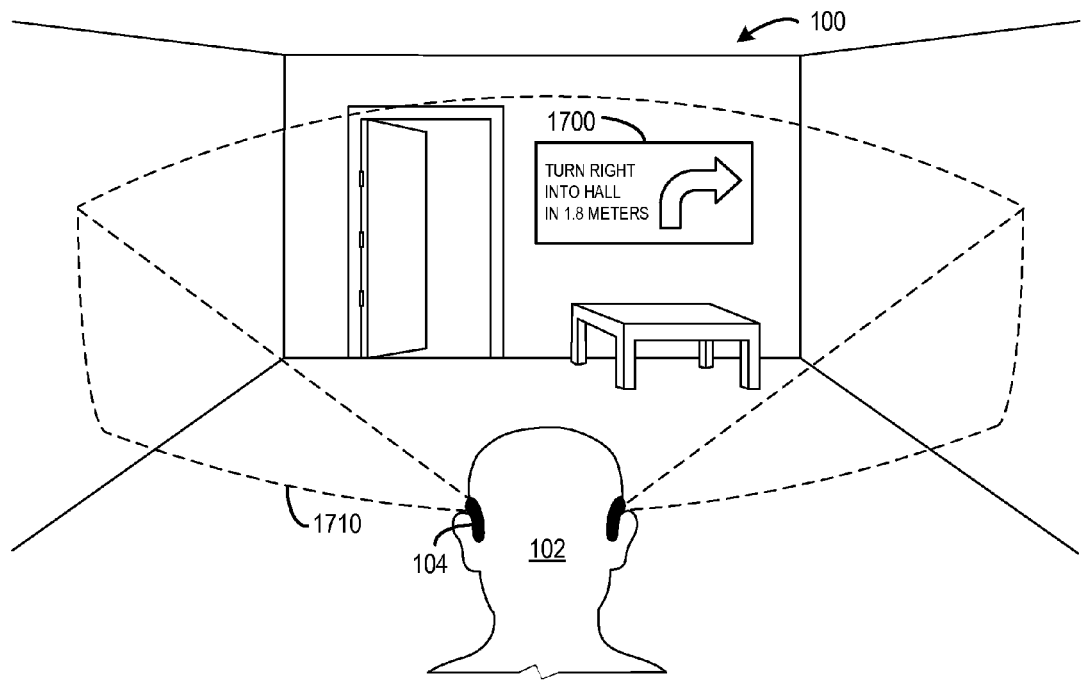
FIGS. 17-18 show an example navigation visualization that includes turn-by-turn navigation directions corresponding to a path of traversable edges of a traversability graph.
Figure 18:
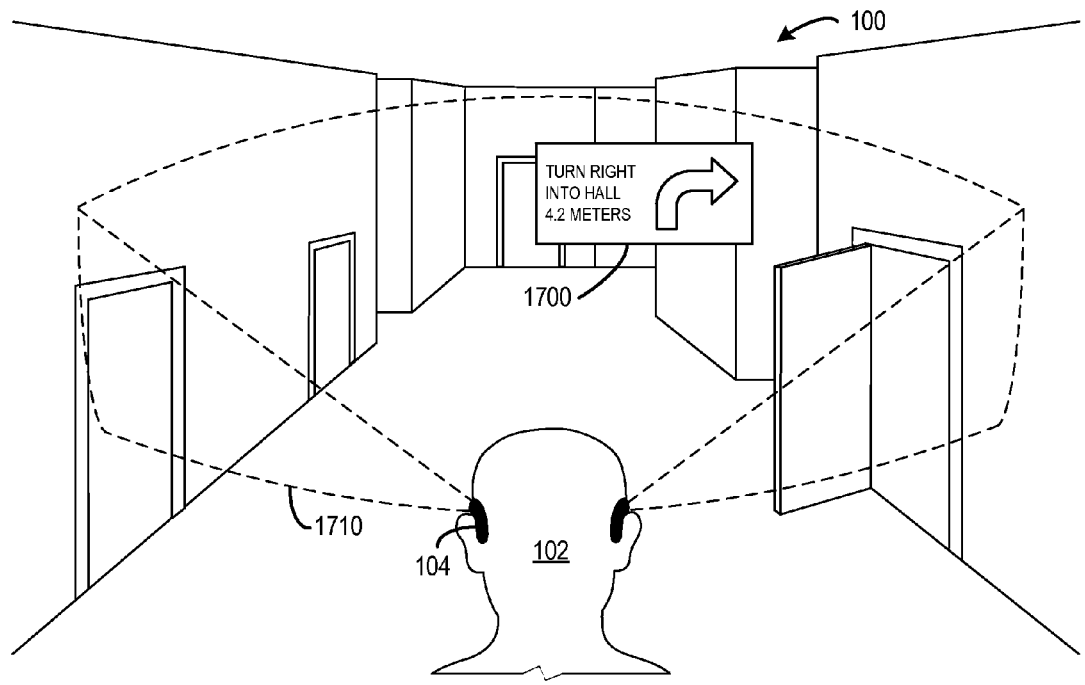

FIGS. 17-18 show an example navigation visualization 1700 that includes turn-by-turn navigation directions corresponding to a path of traversable edges of a traversability graph. FIG. 17 shows the environment 100 as viewed by the user 102 through a field of view 1710 of the display 108 (shown in FIG. 1) of the head-mounted computing device 104. In the illustrated example, the turn-by-turn navigation directions 1700 are presented in an upper right corner of the field of view 1710 of the display 108 so as not to fully occlude the view of the user 102. The turn-by turn navigation directions 1700 may be displayed in any portion of the field of view 1710 of the display 108. In some implementations, the turn-by-turn navigation directions 1700 may be body-locked. In other implementations, the turn-by turn navigation directions 1700 may be displayed so as to appear as being located on a surface of the environment. As such, a position of the turn-by-turn navigation directions 1700 in the field of view 1710 of the display 108 may change based on the surfaces in the environment 100 that are viewable by the user 102 through the field of view 1710 of the display 108.

In FIG. 18, the user 102 has followed the turn-by-turn navigation directions 1700 out of the room and into a hallway. As the user 102 moves throughout the environment 100, the display 108 updates presentation of the turn-by-turn navigation directions 1700 in the field of view 1710 to correspond to a vertex of the path that is nearest to a current pose of the computing device 104.

In the above described examples, the computing device 104 is a head-mounted computing device, and the display 108 is a see-through display that may be configured to visually present an augmented reality image of the navigation visualization of the path. In other implementations, the computing device may include a display configured to show an image of the environment, and the navigation visualization may be presented as an overlay to the image of the environment. For example, the computing device may be a smartphone including a camera and a display.

Figure 19:
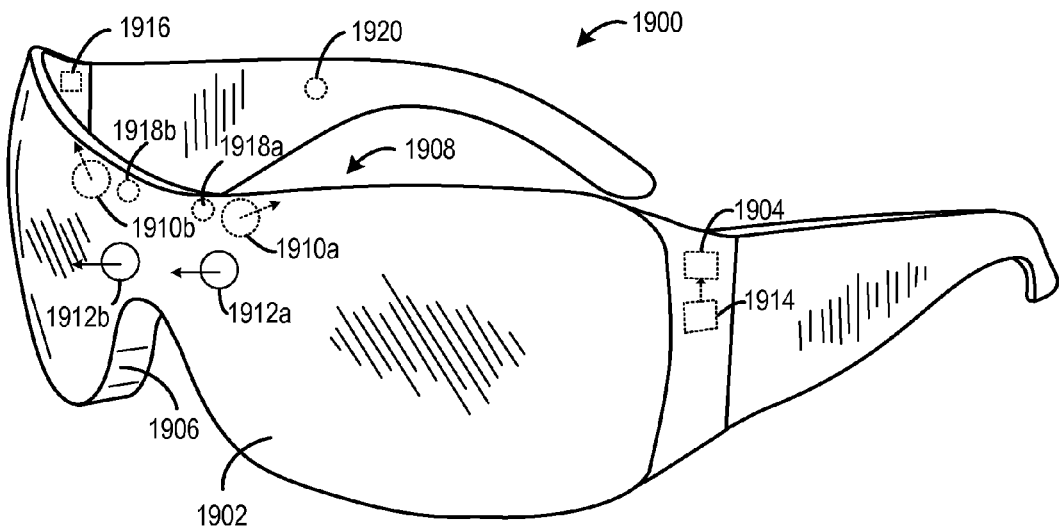
FIG. 19 shows an example head-mounted computing system.

FIG. 19 shows a non-limiting example of a head-mounted computing device 1900 in the form of a pair of wearable glasses with a see-through display 1902. The head-mounted computing device may be representative of the computing device 104 shown in FIG. 1. A head-mounted computing device may take any other suitable form in which a transparent, semi-transparent, and/or non-transparent display is supported in front of a viewer's eye or eyes. Further, implementations described herein may be used with any other suitable computing device, including but not limited to mobile computing devices, smartphones, laptop computers, desktop computers, tablet computers, and other wearable computers.

The computing device 1900 includes a see-through display 1902 and a controller 1904. The see-through display 1902 may enable images such as holographic objects to be delivered to the eyes of a wearer of the computing device 1900. The see-through display 1902 may be configured to visually augment an appearance of a real-world, physical environment to a wearer viewing the physical environment through the transparent display. In one example, the see-through display 1902 may be configured to display one or more user interface (UI) objects on a graphical user interface. In some implementations, the UI objects presented on the graphical user interface may be virtual objects overlaid in front of the real-world environment. Likewise, in some implementations, the UI objects presented on the graphical user interface may incorporate elements of real-world objects of the real-world environment seen through the see-through display 1902. In other examples, the see-through display 1902 may be configured to visually present one or more other graphical objects, such as virtual objects associated with pedestrian-scale navigation directions.

Any suitable mechanism may be used to display images via the see-through display 1902. For example, the see-through display 1902 may include image-producing elements located within lenses 1906 (such as, for example, a see-through Organic Light-Emitting Diode (OLED) display). As another example, the see-through display 1902 may include a display device (such as, for example a liquid crystal on silicon (LCOS) device or OLED microdisplay) located within a frame of the head-mounted computing device 1900. In this example, the lenses 1906 may serve as, or otherwise include, a light guide for delivering light from the display device to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The head-mounted computing device 1900 may also include various a location sensor system 1908 to provide measured parameters of the surrounding environment and other information to the controller 1904. Such sensors may include, but are not limited to, one or more inward facing image sensors 1910a and 1910b, one or more outward facing image sensors 1912a and 1912b, an IMU 1914, and one or more microphones 1916. The one or more inward facing image sensors 1910a, 1910b may be configured to acquire image data in the form of gaze tracking data from a wearer's eyes (e.g., sensor 1910a may acquire image data for one of the wearer's eye and sensor 1910b may acquire image data for the other of the wearer's eye). The head-mounted computing device 1900 may be configured to determine gaze directions of each of a wearer's eyes in any suitable manner based on the information received from the image sensors 1910a, 1910b. For example, one or more light sources 1918a, 1918b, such as infrared light sources, may be configured to cause a glint of light to reflect from the cornea of each eye of a wearer. The one or more image sensors 1910*a*, 1910*b* may then be configured to capture an image of the wearer's eyes. Images of the glints and of the pupils as determined from image data gathered from the image sensors 1910*a,* 1901*b* may be used by the controller 1904 to determine an optical axis of each eye. Using this information, the controller 1904 may be configured to determine a direction the wearer is gazing. The controller 1904 may be configured to additionally determine an identity of a physical and/or virtual object at which the wearer is gazing.

The one or more outward facing image sensors 1912*a*, 1912*b* may be configured to receive physical environment data from the physical environment in which the head-mounted computing device 1900 is located. Data from the outward facing image sensors 1912*a*, 1912*b* may be used to determine 6-DOF pose data (e.g., from imaging environmental features) that enables pose tracking of the head-mounted computing device 1900 in the real-world environment.

The IMU 1914 may be configured to provide position and/or orientation data of the head-mounted computing device 1900 to the controller 1904. In one implementation, the IMU 1914 may be configured as a three-axis or three-degree of freedom position sensor system. This example position sensor system may, for example, include three gyroscopes to indicate or measure a change in orientation of the head-mounted computing device 1900 within 3D space about three orthogonal axes (e.g., x, y, z) (e.g., roll, pitch, yaw).

As discussed above, the outward facing image sensors 1912*a*, 1912*b* and the IMU 1914 may be used in conjunction to determine a 6-DOF pose of the head-mounted computing device 1900. For example, the pose may be estimated using a SLAM pose tracking approach.

The head-mounted computing device 190 may also support other suitable positioning techniques, such as GPS or other location tracking systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras), communication devices (e.g., WIFI antennas/interfaces), and other data sources.

Continuing with FIG. 19, audio outputs may be presented to the wearer via one or more speakers, such as speaker 1920. In some implementations, turn-by-turn navigation directions along a path of a traversability graph may be audibly presented by the speaker 1920.

The controller 1904 may include a logic machine and a storage machine, discussed in more detail below with respect to FIG. 20, in communication with the location sensor system 1908 and the see-through display 1902 of the head-mounted computing device 1900.

In some implementations, the methods and processes described herein may be tied to a computing system of one or more computing devices. In particular, such methods and processes may be implemented as a computer-application program or service, an application-programming interface (API), a library, and/or other computer-program product.

Figure 20:
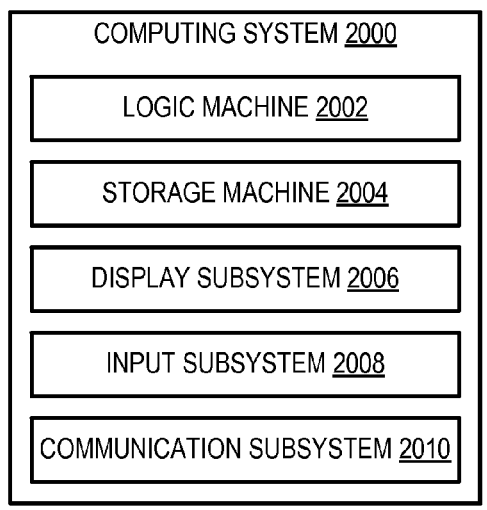
FIG. 20 shows an example computing system.

FIG. 20 schematically shows a non-limiting implementation of a computing system 2000 representative of various computing devices discussed throughout the present description, such as the computing device 104 shown in FIG. 1 and the computing device 1900 shown in FIG. 19. Computing system 2000 is shown in simplified form. Computing system 2000 may take the form of one or more head-mounted computing devices, personal computers, server computers, tablet computers, home-entertainment computers, network computing devices, gaming devices, mobile computing devices, mobile communication devices (e.g., smart phone), and/or other computing devices.

Computing system 2000 includes a logic machine 2002 and a storage machine 2004. Computing system 2000 may optionally include a display subsystem 2006, input subsystem 2008, communication subsystem 2010, and/or other components not shown in FIG. 20.

Logic machine 2002 includes one or more physical devices configured to execute instructions. For example, the logic machine 2002 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 2002 may include one or more processors configured to execute software instructions. Additionally or alternatively, the logic machine 2002 may include one or more hardware or firmware logic machines configured to execute hardware or firmware instructions. Processors of the logic machine 2002 may be single-core or multi-core, and the instructions executed thereon may be configured for sequential, parallel, and/or distributed processing. Individual components of the logic machine 2002 optionally may be distributed among two or more separate devices, which may be remotely located and/or configured for coordinated processing. Aspects of the logic machine 2002 may be virtualized and executed by remotely accessible, networked computing devices configured in a cloud-computing configuration.

Storage machine 2004 includes one or more physical devices configured to hold instructions executable by the logic machine 2002 to implement the methods and processes described herein. When such methods and processes are implemented, the state of storage machine 2004 may be transformed—e.g., to hold different data.

Storage machine 2004 may include removable and/or built-in devices. Storage machine 2004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 2004 may include volatile, nonvolatile, dynamic, static, read/write, read-only, random-access, sequential-access, location-addressable, file-addressable, and/or content-addressable devices.

Storage machine 2004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 2002 and storage machine 2004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2000 implemented to perform a particular function. In some cases, a module, program, or engine may be instantiated via logic machine 2002 executing instructions held by storage machine 2004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 2006 may be used to present a visual representation of data held by storage machine 2004. This visual representation may take the form of a graphical user interface (GUI). As the herein described methods and processes change the data held by the storage machine 2004, and thus transform the state of the storage machine 2004, the state of display subsystem 2006 may likewise be transformed to visually represent changes in the underlying data. Display subsystem 2006 may include one or more display devices utilizing virtually any type of technology. Such display devices may be combined with logic machine 2002 and/or storage machine 2004 in a shared enclosure, or such display devices may be peripheral display devices.

When included, input subsystem 2008 may comprise or interface with one or more user-input devices such as a keyboard, mouse, touch screen, or game controller. In some implementations, the input subsystem 2008 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2010 may be configured to communicatively couple computing system 2000 with one or more other computing devices. Communication subsystem 2010 may include wired and/or wireless communication devices compatible with one or more different communication protocols. As non-limiting examples, the communication subsystem 2010 may be configured for communication via a wireless telephone network, or a wired or wireless local- or wide-area network. In some implementations, the communication subsystem 2010 may allow computing system 2000 to send and/or receive messages to and/or from other devices via a network such as the Internet.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
    a location sensor system including one or more sensors configured to measure one or more parameters of a surrounding environment;
    a pose-tracking engine configured to determine a current pose of the computing device based on the one or more measured parameters of the surrounding environment;
    a graphing engine configured to access a traversability graph including a plurality of vertices each having a local coordinate system;
    a navigation engine configured to identify a nearby vertex of the traversability graph relative to the current pose, and configured to determine a path of traversable edges between the nearby vertex and a destination vertex of the traversability graph, and
    a display configured to visually present as an overlay to the environment a navigation visualization corresponding to the path.

2. The computing device of claim 1, wherein the navigation engine is configured to re-identify a nearby vertex responsive to a change in the current pose, and configured to re-determine the path responsive to a change in the nearby vertex.

3. The computing device of claim 1, wherein the traversability graph is created from pose tracking data acquired by a computing device while moving throughout the environment.

4. The computing device of claim 1, wherein the traversability graph is created from pose tracking data acquired by a plurality of computing devices while moving throughout the environment.

5. The computing device of claim 1, wherein the traversability graph includes a known traversable edge between a connected pair of vertices that has been previously traversed, and an inferred traversable edge between a previously unconnected pair of vertices that has not been previously traversed, the inferred traversable edge selected based on a distance between the previously unconnected pair of vertices being less than a threshold distance.

6. The computing device of claim 5, wherein the traversability graph does not include redundant multi-segment paths traversing a span also traversed by a single-segment.

7. The computing device of claim 5, further comprising:
    a surface reconstruction engine configured to identify surfaces in the environment using the one or more measured parameters, and
    wherein the traversability graph includes an inferred traversable edge that has been validated as not passing through the identified surfaces.

8. The computing device of claim 1, wherein the navigation visualization includes a visual representation of the path from the nearby vertex to the destination vertex.

9. The computing device of claim 1, wherein the navigation visualization includes turn-by-turn navigation directions along the path from the nearby vertex to the destination vertex.

10. The computing device of claim 1, wherein the computing device is a head-mounted computing device, and wherein the display is a see-through display configured to visually present an augmented reality image of the navigation visualization.

11. A computing device, comprising:
- a location sensor system including one or more sensors configured to measure one or more parameters of a surrounding environment;
- a pose-tracking engine configured to determine a current pose of the computing device based on the one or more measured parameters of the surrounding environment;
- a graphing engine configured to access a traversability graph including a plurality of vertices each having a local coordinate system, each of the plurality of vertices being connected to at least one other vertex of the traversability graph by a known traversable edge that has been previously traversed;
- a graph-processing engine configured to identify previously unconnected pairs of vertices of the traversability graph that are spaced apart a distance less than a distance threshold, and configured to, for each identified previously unconnected pair of vertices, create an inferred traversable edge between the unconnected pair of vertices;
- a navigation engine configured to identify a nearby vertex of the traversability graph to the current pose, and configured to determine a shortest path of known traversable edges and inferred traversable edges between the nearby vertex and a destination vertex of the traversability graph, and
- a display configured to visually present as an overlay to the environment a navigation visualization corresponding to the shortest path.

12. The computing device of claim 11, wherein the navigation engine is configured to re-identify a nearby vertex responsive to a change in the current pose, and configured to re-determine the path responsive to a change in the nearby vertex.

13. The computing device of claim 11, wherein the traversability graph is created from pose tracking data acquired by a computing device while moving throughout the environment.

14. The computing device of claim 11, wherein the traversability graph is created from pose tracking data acquired by a plurality of computing devices while moving throughout the environment.

15. The computing device of claim 11, wherein the graph-processing engine is configured to simplify multi-segment paths into fewer segments.

16. The computing device of claim 11, further comprising:
- a surface-reconstruction engine configured to identify surfaces in the environment using the one or more measured parameters, and
- wherein the graph-processing engine is further configured to create an inferred traversable edge that has been validated as not passing through the identified surfaces.

17. The computing device of claim 11, wherein the navigation visualization includes a visual representation of the shortest path from the nearby vertex to the destination vertex.

18. The computing device of claim 11, wherein the navigation visualization includes turn-by-turn navigation directions along the shortest path from the nearby vertex to the destination vertex.

19. A head-mounted computing device, comprising:
- a location sensor system including one or more sensors configured to measure one or more parameters of a surrounding environment;
- a pose-tracking engine configured to determine a current pose of the computing device based on one or more measured parameters of the surrounding environment;
- a graphing engine configured to access a traversability graph including a plurality of vertices;
- a navigation engine configured to identify a nearby vertex of the traversability graph to the current pose, and determine a shortest path of traversable edges between the nearby vertex and a destination vertex of the traversability graph, and
- a see-through display configured to visually present an augmented reality image of a navigation visualization of the shortest path.

20. The head-mounted computing device of claim 19, wherein the navigation engine is configured to re-identify a nearby vertex responsive to a change in the current pose, and configured to re-determine the path responsive to a change in the nearby vertex.

* * * * *